United States Patent
Howland

(10) Patent No.: US 9,616,257 B2
(45) Date of Patent: Apr. 11, 2017

(54) MULTI-LAYER CHEMICAL AND BIOLOGICAL PROTECTION FABRIC FOR MOBILE SHELTERS

(71) Applicant: Warwick Mills Inc., New Ipswich, NH (US)

(72) Inventor: Charles A Howland, Temple, NH (US)

(73) Assignee: Warwick Mills Inc., New Ipswich, NH (US)

( * ) Notice: Subject to any disclaimer, the term of this patent is extended or adjusted under 35 U.S.C. 154(b) by 0 days.

(21) Appl. No.: 13/949,271

(22) Filed: Jul. 24, 2013

(65) Prior Publication Data

US 2014/0030483 A1 Jan. 30, 2014

Related U.S. Application Data

(60) Provisional application No. 61/674,896, filed on Jul. 24, 2012.

(51) Int. Cl.
*A62B 17/00* (2006.01)
*D06N 7/00* (2006.01)
(Continued)

(52) U.S. Cl.
CPC ............ *A62B 17/006* (2013.01); *B32B 5/024* (2013.01); *B32B 7/12* (2013.01); *B32B 27/12* (2013.01);
(Continued)

(58) Field of Classification Search
CPC ....... A62B 17/006; B32B 38/00; B32B 33/00; B32B 5/024; B32B 7/12; B32B 27/12;
(Continued)

(56) References Cited

U.S. PATENT DOCUMENTS

| | | | | |
|---|---|---|---|---|
| 4,442,162 A | * | 4/1984 | Kuester | ............................ 442/46 |
| 5,328,760 A | * | 7/1994 | Gillberg-LaForce | ... B29C 55/12 |
| | | | | 264/145 |

(Continued)

OTHER PUBLICATIONS

PCT Search Report and Written Opinion for PCT Application No. PCT/US2013/051758, Nov. 1, 2013, 11 pages.

*Primary Examiner* — Nathan Van Sell
(74) *Attorney, Agent, or Firm* — Maine Cernota & Rardin

(57) ABSTRACT

A lightweight, low bulk, mobile CB shelter fabric includes a high tensile strength woven scrim laminated between two thin CB-impenetrable polymer films. Laminate adhesives can include isocyanate adhesion promotors. Coatings can provide camouflage, increased light opacity, increased CB protection, sun, fire, and weather resistance. Lamination heat and pressure can cause the films to conform and bond through the scrim, while a pre-applied coating does not flow and remains uniform in thickness. The resulting fabric weight can be approximately 50% of conventional CB fabrics. The films can be hard-drawn polymers. A coating of hammer milled kaolin clay can provide increased light opacity. The films can be 1 micron thick, and can be nylon, aliphatic nylon, urethane, or poly-ether. The scrim can be a 1500 denier Vectran® (liquid crystal polymer) with a 4.5 ends-per-inch warp and a 3.5 ends-per-inch fill. The scrim yarns can be flattened bundles of untwisted fiber.

27 Claims, 5 Drawing Sheets

(51) Int. Cl.
*B32B 38/00* (2006.01)
*B32B 5/02* (2006.01)
*B32B 7/12* (2006.01)
*B32B 27/12* (2006.01)
*B32B 27/34* (2006.01)
*B32B 27/36* (2006.01)
*B32B 33/00* (2006.01)
*B32B 37/12* (2006.01)
*B32B 27/28* (2006.01)
*B32B 37/24* (2006.01)

(52) U.S. Cl.
CPC ............ *B32B 27/281* (2013.01); *B32B 27/34* (2013.01); *B32B 27/36* (2013.01); *B32B 33/00* (2013.01); *B32B 38/00* (2013.01); *D06N 7/00* (2013.01); *B32B 37/12* (2013.01); *B32B 2037/243* (2013.01); *B32B 2255/10* (2013.01); *B32B 2255/26* (2013.01); *B32B 2305/18* (2013.01); *B32B 2307/3065* (2013.01); *B32B 2307/712* (2013.01); *B32B 2307/714* (2013.01); *B32B 2571/00* (2013.01); *Y10T 428/24355* (2015.01); *Y10T 442/164* (2015.04)

(58) Field of Classification Search
CPC ....... B32B 27/281; B32B 27/34; B32B 27/36; B32B 37/12; B32B 2037/243; B32B 2305/18; B32B 2307/712; B32B 2571/00; B32B 2255/10; B32B 2255/26; B32B 2307/3065; B32B 2307/714; D06N 7/00; Y10T 428/24355; Y10T 442/164
USPC ........... 428/141–144, 147, 149, 150; 442/38, 442/40–47
See application file for complete search history.

(56) References Cited

U.S. PATENT DOCUMENTS

| | | |
|---|---|---|
| 5,773,373 A | 6/1998 | Wynne et al. |
| 6,322,657 B1 | 11/2001 | Pontuti et al. |
| 7,595,104 B2 | 9/2009 | Romanowski |
| 2002/0006518 A1* | 1/2002 | Lustig et al. ................ 428/446 |
| 2005/0191918 A1 | 9/2005 | Langley et al. |
| 2007/0137787 A1* | 6/2007 | Howland .................. 156/306.6 |
| 2007/0149678 A1* | 6/2007 | Apoorva et al. .............. 524/430 |
| 2009/0118562 A1* | 5/2009 | Cole ....................... A61L 2/238 588/313 |
| 2010/0210745 A1* | 8/2010 | McDaniel et al. .............. 521/55 |
| 2011/0123757 A1 | 5/2011 | Howland |
| 2011/0189913 A1* | 8/2011 | Eleazer et al. ................ 442/186 |

* cited by examiner

MULTI-LAYER CHEMICAL AND BIOLOGICAL PROTECTION FABRIC FOR MOBILE SHELTERS

RELATED APPLICATIONS

This application claims the benefit of U.S. Provisional Application No. 61/674,896, filed Jul. 24, 2012, which is herein incorporated by reference in its entirety for all purposes.

STATEMENT OF GOVERNMENT INTEREST

Portions of the present invention may have been made in conjunction with Government funding under contract number W911QY-11-C-0078, and there may be certain rights to the Government.

FIELD OF THE INVENTION

The invention relates to fabrics used in the manufacture of mobile shelters, and more particularly, to fabrics used in the manufacture of mobile shelters that provide protection against chemical and biological agents.

BACKGROUND OF THE INVENTION

A continuing need exists for mobile shelters or shelter liners that can protect soldiers and emergency workers from chemical and biological ("CB") agents. Of course, these mobile shelters must also protect occupants from environmental conditions such as rain and wind, and they must be resistant to fire as well as the long term effects of direct sun exposure. Often, such shelters must also have a camouflaged exterior, and they must be opaque to visible and infrared light, so as to reduce detectability when sources of heat and light are present within the shelter at night.

The mobility of a mobile shelter is directly dependent on the weight and packed volume of the fabric used in its manufacture. Current chemical and biological barrier fabrics are typically manufactured by selecting a woven fabric having a desired tensile strength and applying one or more coatings to the fabric that will provide the required protection.

The use of a woven fabric as the basic material from which to fabricate a mobile shelter is dictated by the need for high flexibility combined with high tensile strength. However, woven fabrics by their nature have an uneven surface, whereby as much as 50% or more of the surface consists of pockets or gaps that lie between the interwoven yarns. When applying CB protective coatings, these gaps must be filled by the applied coating material before the coating material can form a protective surface layer over the entire fabric. The excess coating material that fills these gaps can significantly increase the bulk and mass of the coated protective fabric, while contributing little if anything to the protective qualities of the fabric.

CB barrier materials typically have a mass of approximately 25 oz/yd$^2$, and are often provided as liners for standard mobile shelters. These heavy and bulky materials can create a high logistical burden and setup time to warfighters. The burden is so great that often the liners are not supplied or are rarely installed, resulting in fielded shelters that are often not ready to provide CB protection. For example, a typical fabric shelter with a bed capacity of 44 requires an additional CBRN liner with a mass 5,570 lbs, and with a packed volume of approximately 808 ft$^3$.

What is needed, therefore, is a barrier fabric for a mobile shelter that can provide chemical and biological protection equivalent to or better than fabrics currently in use, but with a significantly lower weight and bulk.

SUMMARY OF THE INVENTION

A lightweight, low bulk, mobile shelter fabric that provides chemical and biological protection equivalent to or better than current designs is formed by sandwiching and laminating a high tensile strength woven scrim between two thin, CB impenetrable films. The woven scrim provides the required tensile strength, while the outer and inner films provide the necessary barrier to chemical and biological agents.

In embodiments, the inner and outer films also provide smooth surfaces to which coatings can be applied for camouflage, increased light opacity, increased CB protection, sun and weather resistance, flame resistance, adhesion, and other requirements as needed. Due to the smooth, impenetrable nature of the films, any such applied coatings remain entirely on the surface, thereby minimizing the bulk and weight added by the coatings. In some of these embodiments, the coatings are made with reduced viscosity in solvent formulations, while in other embodiments they are made as reactive formulations.

In various embodiments, the films are applied to the scrim with sufficient heat and pressure to create a conformal laminate in which the films penetrate into the "window" regions in the weave of the scrim, causing the thermoplastic urethane on the inside faces of the films to flow together to form one adhesive layer encapsulating a scrim between them, thereby strengthening the attachment of the films to the laminate. As a result, the films in these embodiments are no longer strictly flat.

In some of these embodiments at least one coating is applied to a film before lamination of the films onto the scrim. The applied heating and pressure are controlled so that the bonding of the inside faces of the films through the scrim weave is maximized without causing the coating to flow. As a result, the thickness of the coating on the film remains uniform, even though the underlying film is no longer completely flat. Substantially complete coverage of the laminate by the coating is thereby maintained without requiring additional coating material to fill the "windows" in the scrim weave. If the face coating were allowed to flow during lamination, then excess coating material would tend to flow into the depressions where the films penetrated into the scrim "windows," and expose yarns creating pinholes disrupting opacity. Additional coating mass would be required to fill any holes created, thereby increasing the overall system mass.

In some embodiments, the films are hard-drawn polymer films, whereby the hard-drawn feature increases the crystallinity of the polymer, and thereby increases the polymer density and reduces its permeability to CB agents.

In various embodiments, the films have a roughness of less than 10 microns. In some embodiments, hammer milled kaolin clay is applied to at least one of the films, either as a separate coating or as a disbursed additive in an elastomeric coating, so as to increase light opacity.

In some embodiments, at least one of the films is a 1 mil nylon film. In other embodiments, at least one of the films is a 1 mil polyimide films or a 1 mil polyester film.

In embodiments, the outer film is coated with an aliphatic urethane for superior weathering and color stability. This urethane can be pigmented to provide camouflage or other required cosmetic appearance. In some embodiments, urethane resin is mixed into a solvent in which it is soluble, to create a urethane coating that can be applied to the film. The percentage of solids in the mixture affects the coating's viscosity, which impacts the final coating deposited. Heating the coating to an elevated temperature of at least 180 F after application to a substrate causes the solvent to rapidly evaporate, depositing the urethane onto the film and forming a solid coating.

In various embodiments, a two-part urethane (herein referred to as "2K urethane") is applied as a coating to one of the film surfaces. 2K urethane coatings are created by reacting the two components used to form urethanes, polyols and isocyanates, directly on the film. Controlling temperature of the two components during mixing allows for the coating viscosity to be maintained for consistent pickup. Forming the urethane directly on the film enhances adhesion of the coating to the film. Adjustments to the 2K urethane recipes can be made to control the amount of crosslinking in the polymer, which can alter the film's hardness, and can adjust its thermo-plasticity. Controlling the thermo-plasticity of the film coatings allows for the thermal lamination of the material without causing the coating to flow.

The inner surface can be coated with a poly-ether urethane for improved strength and reduced cost, since the inner surface is shielded from weathering and UV light. These coatings are typically applied in a solvent based process described supra.

In various embodiments, the use of high bulk strength adhesives overcomes the shear failure often seen in laminated systems between a hard fabric and film. In some embodiments, the use of isocynate adhesion promoters in combination with the crosslinking of the adhesives reduces adhesive failure.

In embodiments, the scrim is a 1500 denier Vectran® (liquid crystal polymer) scrim having 4.5 and 3.5 ends per inch in the warp and fill directions respectively.

In various embodiments, the yarn bundles of the scrim are spread into flattened shapes so as to reduce the thickness of the scrim and increase its surface area or "cover factor," thereby providing more surface area for adhesion between the scrim and the film. Increased bonding surface area helps to overcome the delamination often seen in laminated systems. Flat yarns help to create an overall flatter laminate, and reduce the stress put onto the film at the knuckles (where the yarns cross) during lamination. This stress can lead to pinholes in coatings and sometimes in films.

In embodiments, the films are laminated to the scrim one at a time.

In some embodiments, the weight of the assembled layers is less than 12 oz/yd$^2$.

One general aspect of the present invention is a multi-layer fabric suitable for constructing mobile shelters that provide protection against chemical and biological agents. The fabric includes a woven scrim, an outer polymer film layer attached by a first adhesive to an outer surface of the woven scrim, and an inner polymer film layer attached by a second adhesive to an inner surface of the woven scrim, at least one of the outer polymer film layer and the inner polymer film layer being resistant to penetration by chemical and biological ("CB") agents.

In embodiments, at least one of the films is made from a hard drawn polymer. In some embodiments, at least one of the films has a roughness of less than 10 microns.

In various embodiments, at least one coating is applied to at least one surface of one of the films. In some of these embodiments, the coating includes a hammer milled kaolin clay. In other of these embodiments the coating provides a camouflaged exterior appearance to the fabric. In still other of these embodiments, the coating provides at least one of increased light opacity, increased infra-red opacity, increased CB penetration protection, flame retardance, and increased resistance to damage from sunlight. In yet other of these embodiments the coating includes an aliphatic urethane. In still other of these embodiments the coating is formed by reacting two components directly on the film. And in yet other of these embodiments the coating is uniform in thickness.

In certain embodiments, the outer and inner polymer films conform to the weave of the scrim, and the outer and inner film layers are bonded to each other through openings in the scrim weave.

In embodiments, at least one of the first adhesive and the second adhesive includes an isocyanate adhesion promoter. In some embodiments at least one of the films is a 1 mil film made from at least one of nylon, polyimide, and polyester. In other embodiments at least one of the films is flame retardant. various embodiments the outer film is an aliphatic nylon. In certain embodiments the inner film is coated with a poly-ether urethane. And in some embodiments the scrim is a Vectran® (liquid crystal polymer) scrim.

In various embodiments the scrim is a 1500 denier Vectran® (liquid crystal polymer) scrim. In some of these embodiments, the scrim has 4.5 and 3.5 ends per inch in the warp and fill directions respectively.

And in certain embodiments, the scrim includes flattened, non-twisted yarns.

Another general aspect of the present invention is a method for fabricating a multi-layer fabric suitable for constructing mobile shelters that provide protection against chemical and biological agents. The method includes applying a first adhesive to an outer surface of a woven scrim, applying an outer polymer film to the outer surface of the woven scrim, applying a second adhesive to an inner surface of the woven scrim, applying an inner polymer film to the inner surface of the woven scrim, and applying at least one of pressure and heat to the assembled scrim and films so as to cure and set the adhesives.

Embodiments further include applying a coating to at least one surface of at least one of the films. In some of these embodiments the coating includes a hammer milled kaolin clay. In other of these embodiments the coating is applied with a uniform thickness to the film before the film is laminated onto the scrim, sufficient heat and pressure are applied during the lamination to cause the films to conform to the weave of the scrim and to bond to each other through openings in the scrim weave and the applied heat and pressure are insufficient to cause the coating to flow, so that the coating remains uniform in thickness after the lamination.

In still other of these embodiments the coating is formed by reacting two components on the surface of the film. And in yet other of these embodiments, at least one of the adhesives is applied using an isocyanate adhesion promoter.

And in various embodiments further include preparing yarns made of untwisted bundles of fiber, spreading the untwisted bundles into flattened shapes, and weaving the flattened yarns to form the woven scrim.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a lightweight, low bulk, multi-layer fabric that can be used to construct mobile shelters for protecting occupants against chemical and biological ("CB") agents as well as environmental factors such as rain, wind, and sun exposure. The fabric of the present invention provides chemical and biological protection that is equivalent to or better than current designs, while the bulk and weight of the present invention are typically about half of the bulk and weight of the currently used materials. For example, typical CB protection materials currently weigh about 20 oz/yd$^2$, while embodiments of the present invention weigh only about 12 oz/yd$^2$ or less.

The excess weight and bulk of the currently used fabrics arises mainly from excess coating material that must fill in the gaps between yarns in the woven fabric before a protective coating can be formed over the entire surface. Of course, this problem could be avoided by using a non-woven fabric such as a polymer sheet. However, a polymer sheet cannot provide the required tensile strength, unless it is made so thick that it is no longer sufficiently flexible.

Figure 1A:
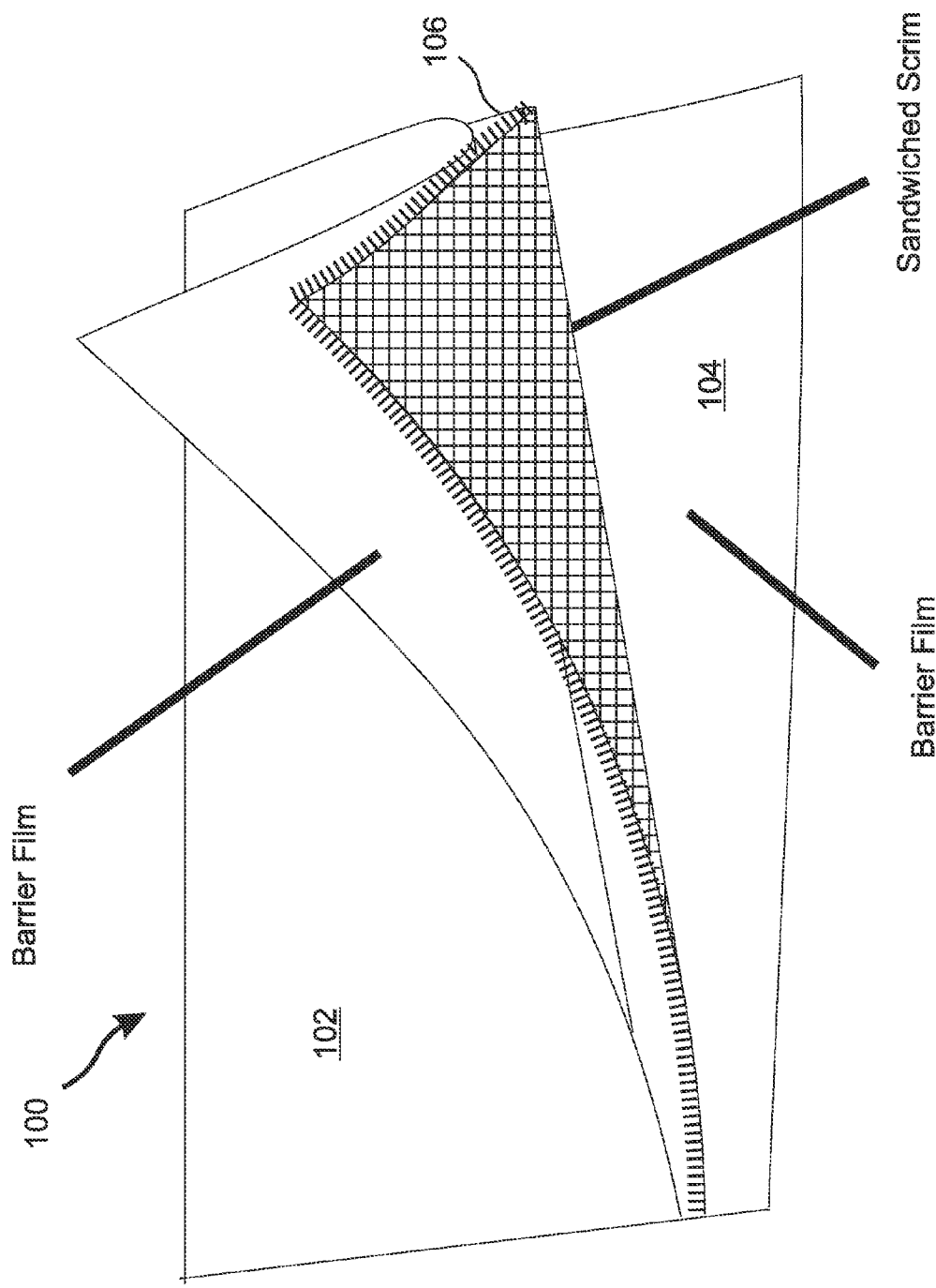
FIG. 1A is a perspective view of a partially disassembled multi-layer fabric in an embodiment of the present invention.

With reference to FIG. 1A, the present invention resolves this dilemma by providing a multi-layer solution 100. The outer 102 and inner 104 layers are thin polymer films that have a high resistance to CB agents and provide smooth surfaces for the application of coatings as required. A woven scrim 106 is sandwiched between the two film layers 102, 104 so as to provide the required tensile strength. Accordingly, this multi-layer approach combines the CB barrier and smooth surface advantages of a polymer film with the tensile strength advantage of a woven fabric.

In certain embodiments, either or both of the film layers 102, 104 is a hard drawn polymer film, whereby the hard-drawn feature increases the crystallinity of the polymer, and thereby increases the polymer density and reduces its permeability to CB agents.

In embodiments, the use of high bulk strength adhesives overcomes the shear failure often seen in laminated systems between a hard fabric and film. In some embodiments, the use of Isocynate adhesion promoters in combination with the crosslinking of the adhesives reduces adhesive failure.

Figure 1B:
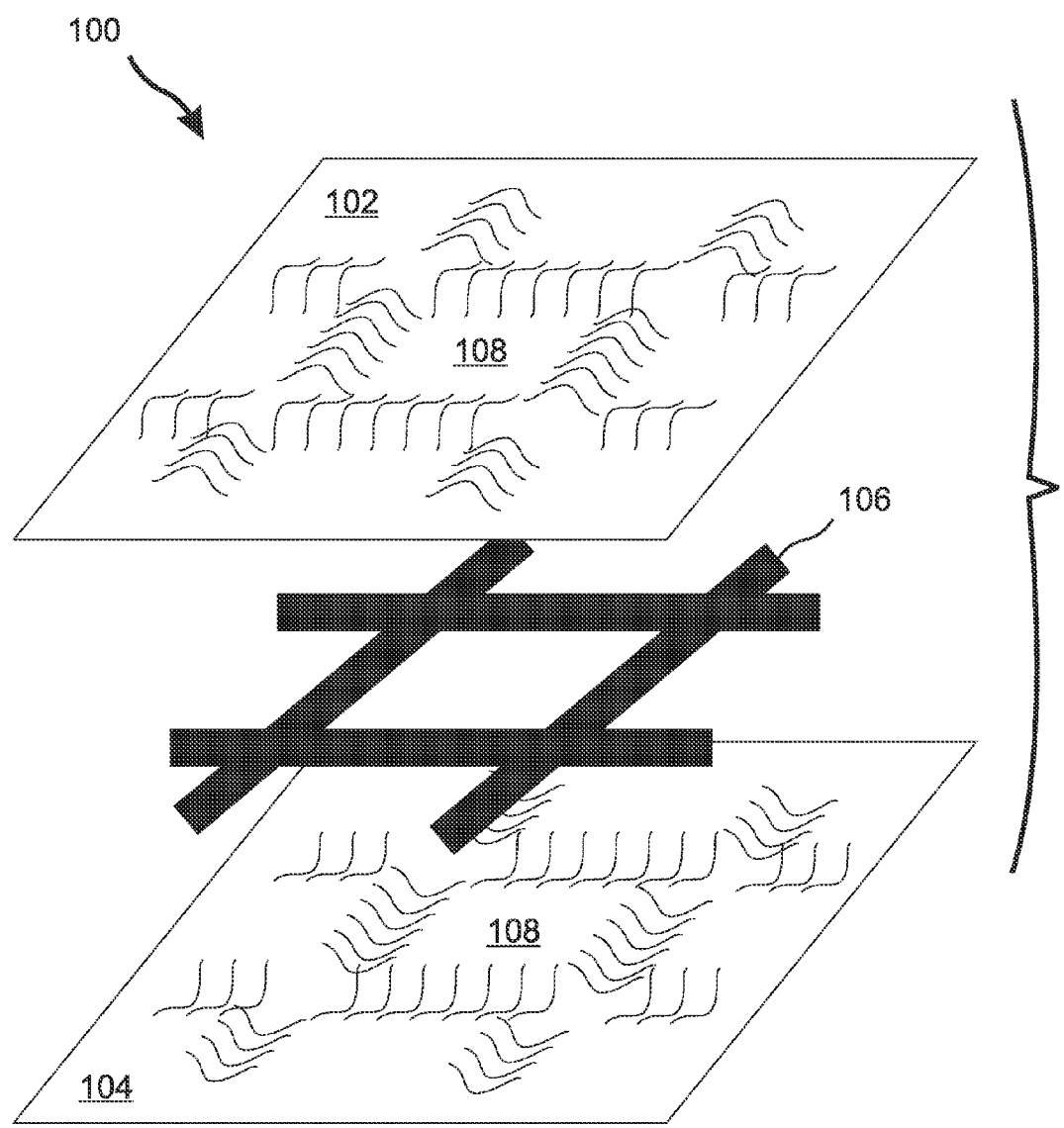
FIG. 1B is a close-up exploded perspective view of a conformal laminate embodiment of the present invention.

With reference to FIG. 1B, in various embodiments the films 102, 104 are applied to the scrim 106 with sufficient heat and pressure to create a conformal laminate in which the films 102, 104 penetrate into the "window" regions 108 in the weave of the scrim 106, causing the thermoplastic urethane on the inside faces of the films 102, 104 to flow together to form one adhesive layer encapsulating the scrim 106 between them, thereby strengthening the attachment of the films 102, 104 to the laminate 100. As a result, the films 102, 104 in these embodiments are no longer strictly flat. Note that FIG. 1B is a close-up exploded view of the laminate 100 of FIG. 1A.

While the polymer film layers themselves provide significant protection against CB agents, it can be desirable to apply coatings to the outer and/or to the inner surfaces of the multilayer fabric assembly 100 for camouflage, increased light opacity, increased CB protection, sun and weather resistance, flame resistance, and other requirements as needed. Due to the smooth, impenetrable nature of the films, any such applied coatings remain entirely on the surfaces, thereby minimizing their added bulk and weight. In various embodiments, the films have a roughness of less than 10 microns.

In some embodiments at least one coating is applied to a film before lamination of the films onto the scrim. In embodiments such as FIG. 1B, the applied heating and pressure are controlled so that the bonding of the inside faces of the films 102, 104 through the scrim weave 106 is maximized without causing the coating to flow. As a result, the thickness of the coating on the film remains uniform even though the underlying film 102, 104 is no longer completely flat. Substantially complete coverage of the laminate 100 by the coating is thereby maintained without requiring additional coating material to fill the "windows" 108 in the scrim weave 106. If the face coating were allowed to flow during lamination, then excess coating material would tend to flow into the depressions 108 where the films 102, 104 penetrate into the scrim "windows" 108, and additional coating mass would be required to fill any holes created, thereby increasing the overall system mass.

In some of these embodiments, the coatings are made with reduced viscosity in solvent formulations, while in other embodiments they are made as reactive formulations.

In various embodiments, a two-part urethane (herein referred to as "2K urethane") is applied as a coating to one of the film surfaces. 2K urethane coatings are created by reacting the two components used to form urethanes, polyols and isocyanates, directly on the film. Forming the urethane directly on the film enhances adhesion of the coating to the film. Adjustments to the 2K urethane recipes can be made to control the amount of crosslinking in the polymer, which can alter the film's hardness, and can adjust its thermo-plasticity. Controlling the thermo-plasticity of the film coatings allows for the thermal lamination of the material without causing the coating to flow.

Figure 2A:
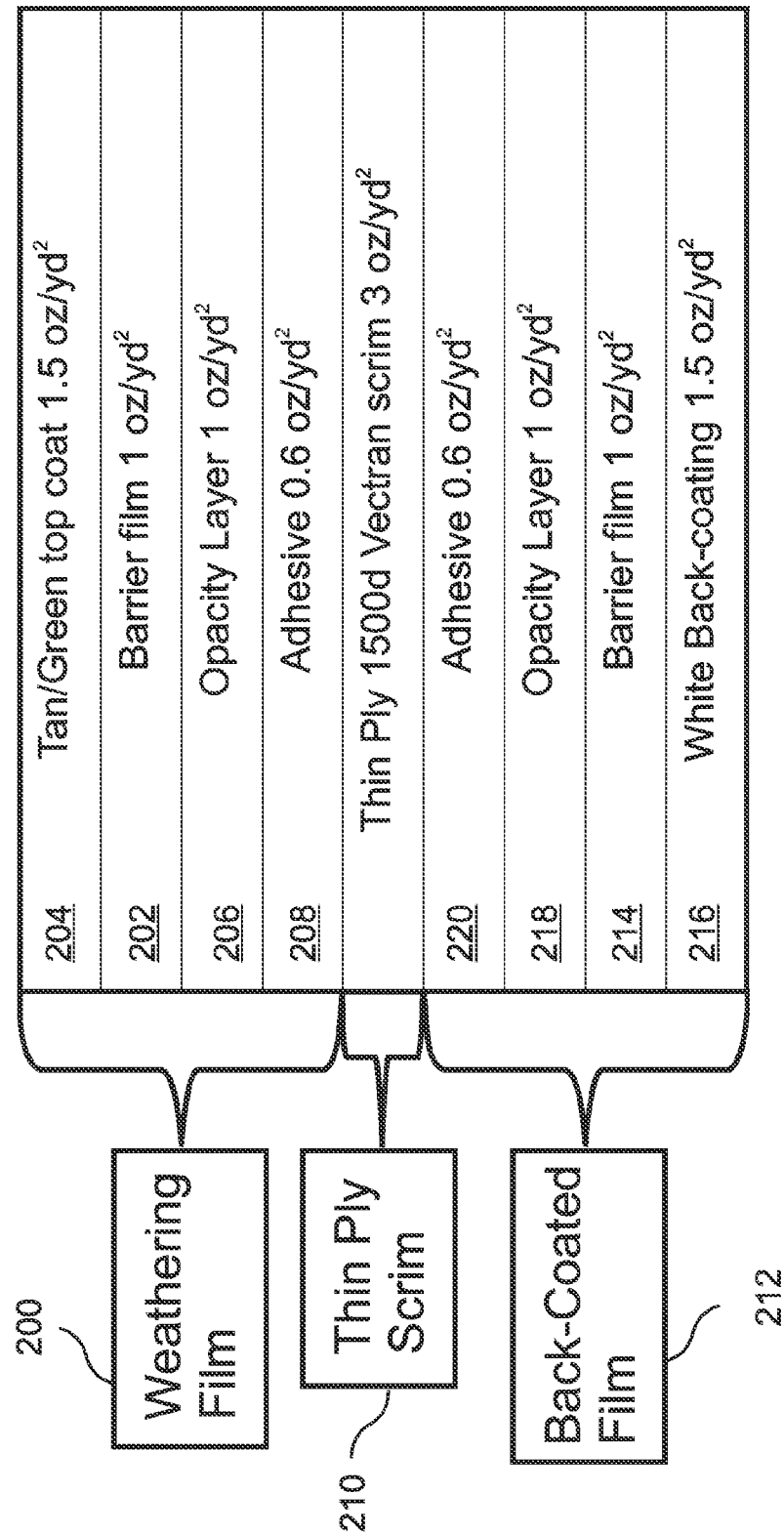
FIG. 2A is a block diagram that illustrates the layer structure of an embodiment of the present invention.

FIG. 2A is a block diagram that illustrates an assembly of layers and coatings in an embodiment of the invention. The embodiment includes an outer "weathering film" section 200 in which a barrier film 202 includes an outer camouflage coating 204 and an inner opacity layer 206. In embodiments, the opacity layer 206 is a coating that contains hammer-milled kaolin clay to further reduce permeation by CB agents while increasing the light opacity of the assembled material.

The weathering film section 200 is joined by an adhesive layer 208 to a central thin ply scrim 210, which in this embodiment is a 1500 denier Vectran® (liquid crystal polymer) scrim having 4.5 and 3.5 ends per inch in the warp and fill directions respectively.

A back-coated film section 212 includes a second barrier film 214 with a white back-coating 216 on its exterior surface for cosmetic purposes, and a second opacity layer 218 on its other surface. The back-coated film section 212 is joined by the adhesive layer 220 to the inner side of the scrim 210. The weight of each layer is indicated in the figure, providing a total weight of 11.2 oz/yd$^2$.

Figure 2B:
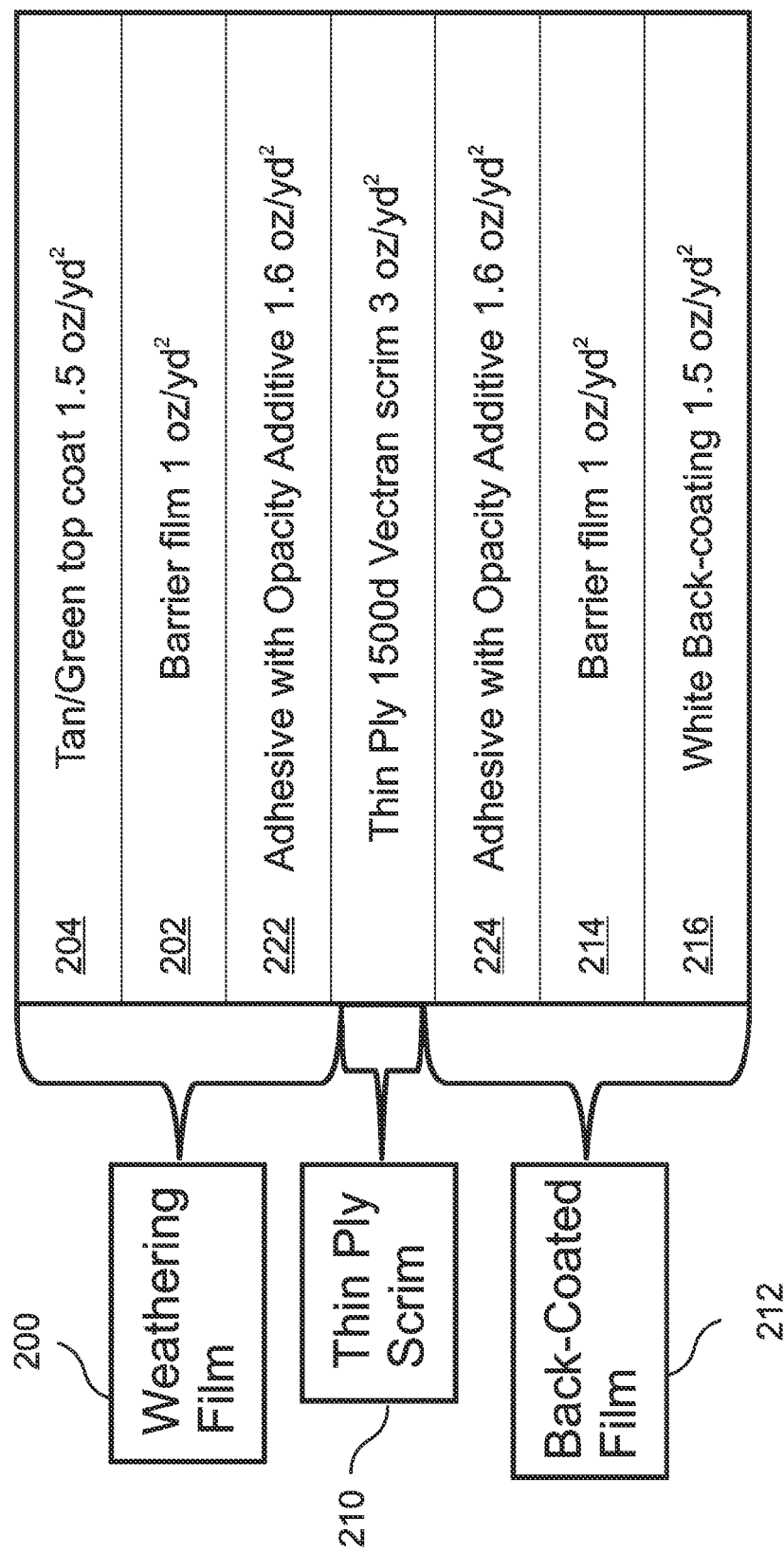
FIG. 2B is a block diagram similar to FIG. 2A, except that an opacity additive has been disbursed in the adhesive layers.

FIG. 2B is a block diagram of an embodiment that is similar to FIG. 2A, except that the separate opacity layers 206, 218 have been omitted, and instead an opacity-enhancing additive such as hammer milled kaolin clay has been disbursed into the adhesive layers 222, 224.

In some embodiments, at least one of the films 202, 214 is a 1 mil nylon film. In other embodiments, at least one of the films 202, 214 is coated with a urethane, which provides good flame retardance and color. In the embodiments of FIGS. 2A and 2B, the outer film 202 is an aliphatic nylon for superior weathering, while the inner film 214 is a poly-ether for improved strength and reduced cost.

Figure 3:
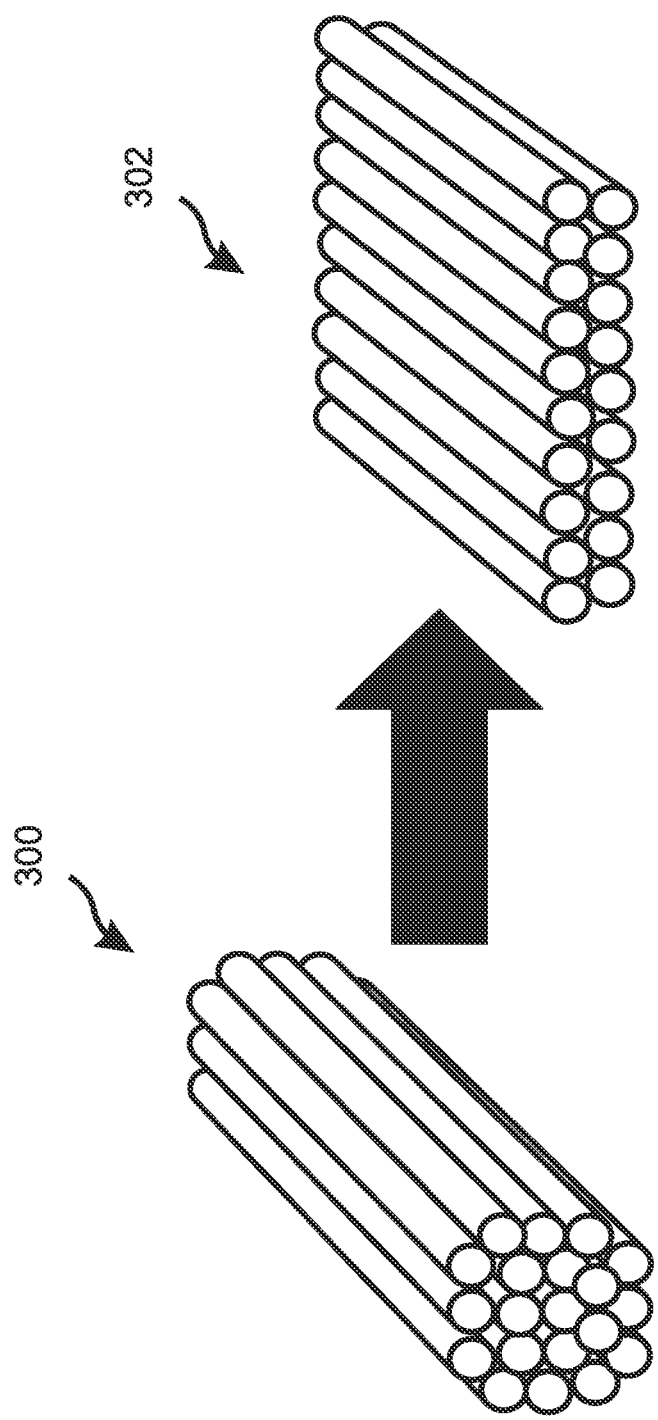
FIG. 3 is a perspective view that compares a scrim yarn formed from a rounded bundle of non-twisted fibers with a scrim yarn formed from a flattened bundle of non-twisted fibers.

With reference to FIG. 3, in various embodiments the yarn bundles of the scrim are untwisted bundles of fibers 300 that are initially round, but are spread into flattened shapes 302 so as to reduce the thickness of the scrim and increase its surface area or "cover factor," thereby providing more surface area for adhesion of the film layers and reducing any tendency of the films to be depressed into gaps between the scrim yarns. FIG. 3 shows a first bundle of fibers 300 as it appears before spreading, and a second bundle of fibers 302 as it appears after spreading.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A multi-layer fabric suitable for constructing mobile shelters that provide protection against chemical and biological agents, the fabric comprising:
   a woven scrim;
   an outer polymer film layer attached by a first adhesive to an outer surface of the woven scrim; and
   an inner polymer film layer attached by a second adhesive to an inner surface of the woven scrim;
   both of the outer polymer film layer and the inner polymer film layer being made from hard drawn polymers,
   the assembled scrim and polymer film layers of said multi-layer fabric having a weight of less than 15 ounces per square yard and being substantially impenetrable to chemical and biological ("CB") agents when included in a mobile shelter that has been packed in a minimized volume during transport thereof.

2. The fabric of claim 1, wherein at least one of the films has a roughness of less than 10 microns.

3. The fabric of claim 1, wherein at least one coating is applied to at least one surface of one of the films.

4. The fabric of claim 3, wherein the coating includes a hammer milled kaolin clay.

5. The fabric of claim 3, wherein the coating provides a camouflaged exterior appearance to the fabric.

6. The fabric of claim 3, wherein the coating provides at least one of increased light opacity, increased infra-red opacity, increased CB penetration protection, flame retardance, and increased resistance to damage from sunlight.

7. The fabric of claim 3, wherein the coating includes an aliphatic urethane.

8. The fabric of claim 3, wherein the coating is formed by reacting two components directly on the film.

9. The fabric of claim 3, wherein the coating is uniform in thickness.

10. The fabric of claim 1, wherein the outer and inner polymer films conform to the weave of the scrim, and the outer and inner film layers are bonded to each other through openings in the scrim weave.

11. The fabric of claim 1, wherein at least one of the first adhesive and the second adhesive includes an isocyanate adhesion promoter.

12. The fabric of claim 1, wherein at least one of the films is a 1 mil film made from at least one of nylon, polyimide, and polyester.

13. The fabric of claim 1, wherein at least one of the films is flame retardant.

14. The fabric of claim 1, wherein the outer film is an aliphatic nylon.

15. The fabric of claim 1, wherein the inner film is coated with a poly-ether urethane.

16. The fabric of claim 1, wherein the scrim is a liquid crystal polymer scrim.

17. The fabric of claim 1, wherein the scrim is a 1500 denier liquid crystal polymer scrim.

18. The fabric of claim 13, wherein the scrim has 4.5 and 3.5 ends per inch in the warp and fill directions respectively.

19. The fabric of claim 1, wherein the scrim includes flattened, non-twisted yarns.

20. The fabric of claim 1, wherein the assembled scrim and polymer film layers of said multi-layer fabric having a weight of not more than 12 ounces per square yard.

21. A method for fabricating a multi-layer fabric suitable for constructing mobile shelters that provide protection against chemical and biological agents, the method comprising:
   applying a first adhesive to an outer surface of a woven scrim;
   applying an outer polymer film to the outer surface of the woven scrim;
   applying a second adhesive to an inner surface of the woven scrim;
   applying an inner polymer film to the inner surface of the woven scrim; and
   applying at least one of pressure and heat to the assembled scrim and films so as to cure and set the adhesives,
   wherein both of the outer polymer film layer and the inner polymer film layer are made from hard drawn polymers, the assembled scrim and polymer film layers of said multi-layer fabric having a weight of less than 15 ounces per square yard and being substantially impenetrable to chemical and biological ("CB") agents when included in a mobile shelter that has been packed in a minimized volume during transport thereof.

22. The method of claim 21, further comprising applying a coating to at least one surface of at least one of the films.

23. The method of claim 22, wherein the coating includes a hammer milled kaolin clay.

24. The method of claim 22, wherein:
   the coating is applied with a uniform thickness to the film before the film is laminated onto the scrim;
   sufficient heat and pressure are applied during the lamination to cause the films to conform to the weave of the scrim and to bond to each other through openings in the scrim weave; and
   the applied heat and pressure are insufficient to cause the coating to flow, so that the coating remains uniform in thickness after the lamination.

25. The method of claim 22, wherein the coating is formed by reacting two components on the surface of the film.

26. The method of claim 22, wherein at least one of the adhesives is applied using an isocyanate adhesion promoter.

27. The method of claim 21, further comprising:
preparing yarns made of untwisted bundles of fiber;
spreading the untwisted bundles into flattened shapes; and
weaving the flattened yarns to form the woven scrim.

* * * * *